June 27, 1961 S. J. BEGUN ET AL 2,990,092

TAPE DRIVE MECHANISM

Filed Oct. 8, 1954 2 Sheets-Sheet 1

*INVENTORS*
SEMI JOSEPH BEGUN
ALFRED P. DANK
*BY*
William J. Flynn
ATTORNEY

*INVENTORS*
SEMI JOSEPH BEGUN
ALFRED P. DANK

*BY* William J. Flynn
ATTORNEY

United States Patent Office 2,990,092

Patented June 27, 1961

2,990,092
TAPE DRIVE MECHANISM

Semi Joseph Begun, Cleveland Heights, and Alfred P. Dank, Euclid, Ohio, assignors to Clevite Corporation, Cleveland, Ohio, a corporation of Ohio Filed Oct. 8, 1954, Ser. No. 461,104
10 Claims. (Cl. 226—176)

This invention relates generally to a drive mechanism for controlling the intermittent advance of a continuous flexible band of material, and is particularly concerned with a quick acting start-stop mechanism in the record tape drive in magnetic recording/reproducing equipment.

In certain applications of magnetic recording it is required that the magnetic recording tape be advanced intermittently so as to make magnetic recordings only during intermittent periods. For precise accuracy this necessitates a mechanism in the record tape drive capable of starting or stopping the record tape quickly to begin or end a recording interval. The present invention is directed to such a start-stop mechanism capable of rapidly starting or stopping the advance of the record tape.

Accordingly, it is an object of this invention to provide a novel and improved start-stop mechanism for controlling the intermittent advance of a continuous flexible record band or tape.

It is also an object of the present invention to provide such a start-stop mechanism which is adapted for extremely rapid tape starting or stopping action.

Another object of this invention is to provide a novel and improved start-stop drive mechanism which is particularly adapted for controlling the intermittent advance of the record tape in magnetic recording/reproducing equipment.

The foregoing objectives, as well as such other and further objects and advantages of the present invention as may become apparent hereinafter, are accomplished in an effective manner by the specific presently preferred embodiments of this invention illustrated in the accompanying drawing and described in the following detailed description.

Figures 1, 2:
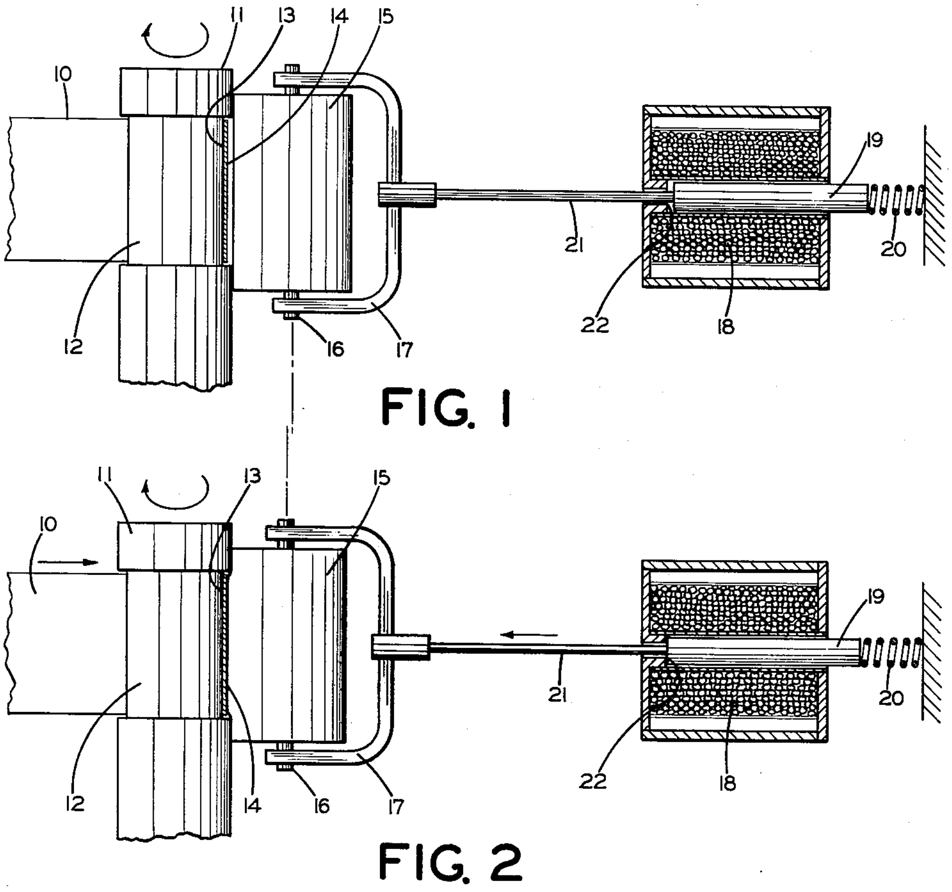
FIGURE 1 is a plan view, with certain parts in section for clarity, showing one embodiment of the present mechanism with the record tape stopped.
FIGURE 2 is a similar view of the FIG. 1 mechanism with the parts positioned to advance the record tape.

Referring to the drawings, there is shown an elongated, flexible, relatively narrow, flat magnetic record tape 10 of the type commonly employed in magnetic recording/reproducing equipment. For example, the tape may be in the form of an acetate or "Mylar" polyester base coated on one face with dispersed magnetic oxide. The record tape is advanced past one or more magnetic recording or reproducing heads by a motor-driven, rotary capstan 11 of suitable metal such as stainless steel. This captan is of generally cylindrical shape and is formed with an annular groove 12 in its periphery between its ends which presents a smooth cylindrical surface disposed radially inwardly of the capstan periphery on either side of the groove. Both the capstan groove surface and the capstan periphery on either side of the groove are concentric about the axis of rotation of the capstan. The record tape 10 extends around the capstan (in this instance, making a 90-degree turn) and is received in the capstan groove 12, with the inner face 13 of the record tape engaging the smooth groove surface on the capstan. This inner face of the record tape may be either its oxide coated face or its smooth opposite face. The tape thickness is slightly less than the depth of the capstan groove, so that the outer face 14 of the record tape in the capstan groove is disposed slightly inwardly of the cylindrical periphery of the capstan on either side of the groove.

A cylindrical, distortable, resilient, rubber roller 15 is mounted rotatively on a shaft 16 carried by a yoke 17. In one practical embodiment the rubber of which the roller is composed is relatively soft, having a Shore hardness within the range from 60 to 70. It is to be understood that this particular hardness range is mentioned merely to illustrate one desirable operative embodiment without, however, intending to limit the present invention in this respect. The periphery of the roller 15 overlies the record tape in the capstan groove 12 and engages the periphery of the capstan on either side of the capstan groove. A solenoid 18 is provided with a reciprocatory plunger 19 which is biased toward the capstan by a compression coil spring 20. A rigid elongated stem 21 interconnects the plunger 19 and yoke 17, so that spring 20 biases the assembly of yoke 17, shaft 16 antd roller 15 toward the capstan. The resilience of the rubber roller 15 opposes the bias exerted by spring 20 and when the solenoid is not energized maintains the parts in the FIG. 1 position, with the left end of the plunger 19 spaced a slight distance from the stop 22 presented by the solenoid housing. In this position of the parts (FIG. 1) the periphery of roller 15 engages snugly the capstan periphery on either side of the capstan groove 12 and the periphery of the roller is substantially undistorted from its normal cylindrical shape, so that the roller is spaced from engagement with the outer face 14 of the record tape in the capstan groove, as shown in FIG. 2.

With this arrangement, when the solenoid is de-energized the parts are positioned as shown in FIG. 1 and described above. The capstan rotates and drives the roller 15 frictionally for rotation about its shaft 16, due to the tangential engagement of the roller with the capstan on either side of the capstan groove 12. However, the tape 10 remains stationary, with the smooth capstan groove surface 12 slipping past the inner face 13 of the tape.

When the solenoid 18 is energized, it moves plunger 19 into engagement with the stop 22, thereby shifting the assembly of yoke 17, shaft 16 and roller 15 toward the capstan. The force exerted by the solenoid overcomes the resilience of the roller 15 and the distortable material of the roller is squeezed into the capstan groove and grips tightly the outer face 14 of the record tape thereat (FIG. 2). The capstan 11 continues to drive the roller 15 frictionally and the rotating roller, due to its gripping engagement with the outer face 14 of the tape, causes the tape to advance past the capstan.

When the solenoid is again de-energized, the resilience of the rubber roller 15 causes the parts to return to the position shown in FIG. 1 and the record tape stops immediately.

It is to be noted that very little inertia is involved in changing from start to stop, or vice versa, in the present mechanism. In both positions the capstan and the rubber roller rotate continuously and the only movement required in changing from one condition to the other is to shift the axis of rotation of the roller slightly toward or away from the capstan, depending upon the action desired. Only the inertia of the tape is required to be overcome in order to start the tape moving.

Figure 3:
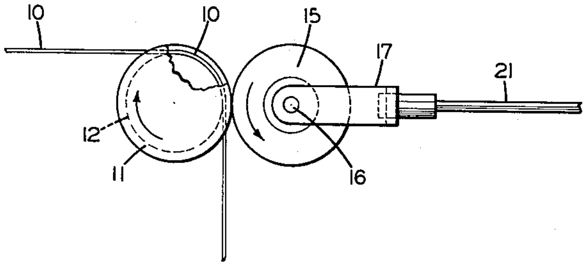
FIGURE 3 is a fragmentary top view, with parts broken away for clarity, showing the present mechanism with the record tape stopped.
Figure 4:
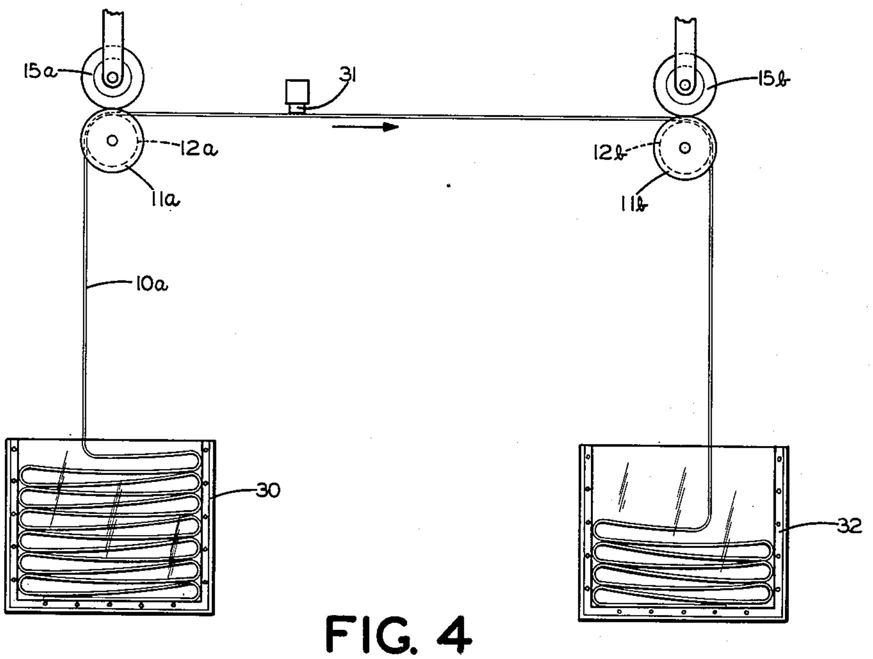
FIGURE 4 is a schematic diagram of one type of magnetic recorder arrangement in which the present mechanism has particular utility.

The present invention has its greatest utility in equipment in which minimum inertia is required to be overcome to start or stop the record tape. For example, FIG. 4 illustrates one arrangement in which the present start-stop mechanism may be employed to great advantage. Here, the magnetic record tape 10*a* is supplied from a receptacle 30 which has front and back walls spaced apart just slightly greater than the tape width and in which successive portions of the length of the tape overlie one another, as shown in FIG. 4. The record tape extends around a first capstan 11*a* having a peripheral groove 12*a* which receives the record tape. A distortable cylindrical rubber roller 15*a* is mounted in tangential relationship with the capstan 11*a*, overlying the record tape in the capstan groove. The construction and operation of this capstan and roller mechanism is the same as that described above in connection with FIGS. 1–3. An identical capstan and roller arrangement 11*b*, 15*b* engages the record tape 10*a* a predetermined distance away from the first capstan and roller mechanism. Between these capstan and roller mechanisms a magnetic recording head 31 is positioned to record on the moving record tape. In place of, or in addition to the recording head, there may be provided a reproducing head, and also an erase head, if desired. Beyond the second roller and capstan mechanism 11*b*, 15*b* the record tape is received in a receptacle 32 similar to its reception in the supply receptacle 30.

In the operation of this mechanism, the only tension exerted on the record tape is by the respective roller and capstan mechanisms when the rollers are actuated to engage the tape. The remainder of the record tape beyond roller and capstan mechanisms is slack. Therefore, when the roller and capstan mechanisms are changed simultaneously from start to stop, or vice versa, only the inertia of that portion of the tape between the respective roller and capstan mechanisms need be overcome, in addition to the inertias involved in displacing the rubber rollers 15*a* and 15*b* toward or away from the respective capstans.

Other appropriate systems in which only part of the record tape is under tension and in which the supply and takeup apparatus for the record tape do not exert inertias which must be overcome by the present start-stop mechanism may employ the present start-stop mechanism to particular advantage.

Figure 5:
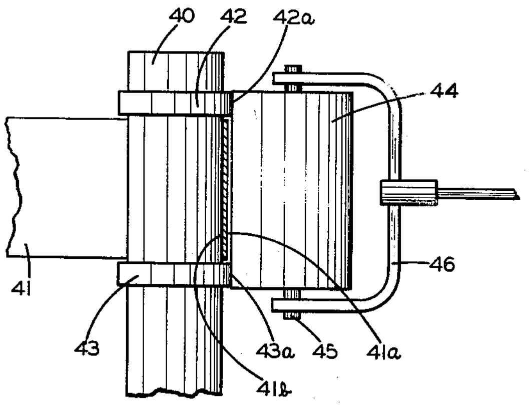
FIGURE 5 is a fragmentary view, similar to FIG. 1, showing a modified form of the present invention.

An alternative embodiment of the present invention is illustrated schematically in FIG. 5. Here the rotary capstan is in the form of a shaft 40 having a cylindrical periphery concentric with the axis of rotation of the capstan and around which the flexible flat record tape 41 extends, and a pair of identical rigid rings 42, 43 disposed on opposite sides of the portion of the shaft 40 around which the record tape extends. These capstan rings present cylindrical peripheral surfaces 42*a* and 43*a*, respectively, which are concentric with the cylindrical periphery of shaft 40 and which are disposed radially outward beyond the periphery of shaft 40 by a distance slightly greater than the thickness of the record tape 41. In effect, the capstan rings 42, 43 define a peripheral groove in the capstan receiving the record tape. A roller 44 of distortable, resilient rubber is mounted on a shaft 45 carried by yoke 46 for rotation about an axis parallel to the axis of rotation of the capstan.

By an arrangement similar to that shown in FIGS. 1 and 2 the roller 44 is biased to engage the outer surfaces 42*a* and 43*a* on the capstan rings, with the roller at this time being spaced slightly from the outer face 41*a* of the record tape extending around the capstan. In this condition of the parts, as the capstan rotates it rotates the roller 44 due to the frictional engagement of the capstan rings 42, 43 with the periphery of the roller 44. However, the smooth groove surface of the capstan slips past the inner face 41*b* of the record tape and the record tape is stationary.

When the yoke 46 is actuated to the left in FIG. 5, such as by the energization of a solenoid as in FIGS. 1 and 2, the material of the roller 44 is squeezed into the groove between the capstan rings 42, 43 and engages the outer face 41*a* of the record tape at the capstan. Therefore, as the capstan rotates and drives the roller 44 for rotation the record tape is advanced by the combined action of the capstan and roller.

When the solenoid is again de-energized, the resilience of the rubber roller 44 causes the parts to return to the FIG. 5 position and the record tape stops immediately.

Figure 6:
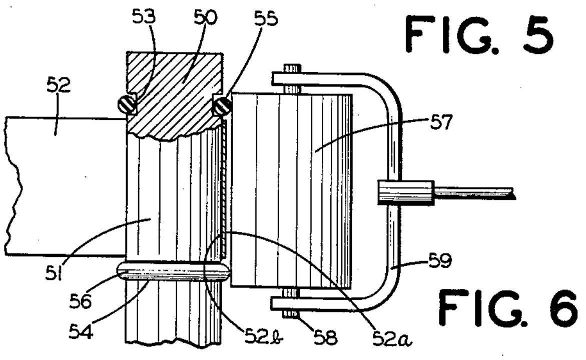
FIGURE 6 is a view similar to FIG. 5, with parts broken away, showing a still further embodiment of the invention.

FIGURE 6 shows a still further embodiment of the present invention. In this embodiment there is provided a motor-driven rotary metal capstan 50 which has a smooth cylindrical peripheral portion 51 concentric about the axis of rotation of the capstan and around which the flat record tape 52 extends, with the inner face 52*b* of the tape engaging the cylindrical capstan periphery. On either side of its cylindrical tape-receiving position 51 the capstan is formed with peripheral grooves 53 and 54, which receive O-rings 55 and 56 of distortable resilient material, such as rubber. In their normal undistorted condition these O-rings present circular surfaces which project radially outward beyond the cylindrical capstan periphery slightly greater than the thickness of the record tape 52. A cylindrical roller 57 of suitable hard material such as metal, preferably with a peripheral surface sufficiently rough to grip the outer face 52*a* of the tape when in engagement therewith, is mounted on a shaft 58 carried by a yoke 59 for rotation about an axis parallel to the axis of rotation of the capstan.

By an arrangement similar to that shown in FIGS. 1 and 2, the roller 57 is biased to engage tangentially and frictionally the O-rings 55 and 56 without substantially compressing the material of the O-rings, so that the roller at this time is spaced slightly from the outer face 52*a* of the record tape extending around the capstan. In this condition of the parts, as shown in FIG. 6, as the capstan rotates, it rotates the roller 57 through the tangential frictional engagement of the capstan O-rings 55, 56 and the roller. The smooth cylindrical peripheral surface 51 on the capstan slips past the inner face 52*b* of the record tape and the record tape is stationary.

When the roller-supporting yoke 59 is actuated to the left in FIG. 6, such as by the energization of a solenoid as in FIGS. 1 and 2, the material of the O-rings 55, 56 is compressed radially inwardly of the outer face 52*a* of the record tape at the capstan and the periphery of the roller 57 engages the outer face 52*a* of the record tape. The record tape is gripped between the cylindrical capstan periphery 51 and the roller and is advanced by the combined action of the rotating capstan and roller, the roller still being driven frictionally by the capstan.

When the solenoid is again de-energized, the resilience of the O-rings 55 and 56 causes the parts to return to the position shown in FIG. 6, and the record tape stops immediately.

While in the foregoing description and in the accompanying drawings there are disclosed three specific preferred embodiments of the present invention as applied to magnetic record tapes, it is to be understood that various modifications, omissions and refinements which depart from these particular embodiments may be adopted without departing from the spirit and scope of this invention. For example, the present mechanism may be applied to the starting and stopping of other types of tapes or bands, particularly other record tapes, such as punched paper tapes and the like.

We claim:

1. In combination, a rotary capstan presenting a smooth cylindrical surface which defines a tape receiving portion and an outer surface disposed outward beyond said cylindrical surface at one side thereof, a flexible flat tape extending around the capstan at one side of said outer capstan surface with its inner face engaging said cylindrical capstan surface, said tape having a thickness slightly less than the spacing of said outer capstan surface beyond said cylindrical capstan surface, a rotatable roller of distortable resilient material extending across the tape at the capstan and extending on at least said one side of said cylindrical capstan surface, a roller support supporting the roller for rotation tangent to the capstan, means biasing the roller support to position the roller in engagement with said outer capstan surface to be rotated frictionally by the capstan and spaced from engagement with the outer face of the tape at the capstan, and means for selectively forcing the roller support toward the capstan to distort the material of the roller into engagement with the outer face of the tape.

2. In combination, a rotary capstan presenting a smooth first cylindrical surface concentric about the axis of rotation of the capstan which defines a tape receiving portion, said capstan also presenting on opposite sides of said tape receiving portion outer cylindrical surfaces concentric with said first cylindrical surface which are disposed beyond said first cylindrical surface radially outward from the axis of rotation of the capstan, a flexible flat record tape extending around the capstan between said outer capstan surfaces with its inner face engaging said first cylindrical capstan surface, said tape having a thickness slightly less than the spacing of said outer capstan surfaces radially outward beyond said first cylindrical capstan surface so that the outer face of the tape is disposed radially inwardly of said outer capstan surfaces, a rotatable roller of distortable resilient material extending across the tape at the capstan and extending on both sides of said first cylindrical capstan surface, a roller support supporting the roller for rotation tangent to the capstan, means biasing the roller support to position the roller in engagement with said outer capstan surfaces to be rotated frictionally by the capstan and spaced from engagement with the outer face of the tape at the capstan, and means for selectively forcing the roller support toward the capstan to distort the material of the roller between said outer capstan surfaces into engagement with the outer face of the tape.

3. In combination, a rotary capstan having an annular peripheral groove between its ends which presents a smooth cylindrical surface and cylindrical peripheral portions on either side of said groove disposed outward beyond said groove surface, a flexible flat magnetic record tape extending around the capstan and received in said capstan groove with its inner face contacting said smooth capstan groove surface, said record tape having a thickness slightly less than the depth of said capstan groove so that the outer face of the tape in the capstan groove is disposed inwardly of the capstan periphery on either side of said groove, a rotatable cylindrical roller of distortable resilient rubber extending across the tape in the capstan groove and extending on either side of the capstan groove, a roller support supporting the roller for rotation about an axis extending parallel to the axis of rotation of the capstan, means biasing the roller support to position the roller in tangential engagement with the periphery of the capstan on either sides of said groove to be driven frictionally by the capstan and spaced from engagement with the outer face of the tape in the capstan groove due to the resilience of the roller opposing said biasing means so that the tape remains stationary in this position of the roller, with the smooth capstan groove surface slipping past the inner face of the tape as the capstan rotates, and means for selectively forcing the roller support toward the capstan to distort the material of the roller into said capstan groove to grip the outer face of the tape for advancing the tape past the capstan as the capstan rotates and the roller is driven frictionally thereby.

4. The combination of claim 3, wherein said roller support comprises a yoke carrying a shaft which supports the roller for rotation, and said last-mentioned means comprises a solenoid having a reciprocatory plunger having a connection to said yoke to force the assembly of the yoke, shaft and roller toward the capstan in response to energization of the solenoid.

5. In combination, a rotary capstan having an annular peripheral groove which presents a smooth cylindrical surface, a flexible flat tape extending around the capstan and received in said capstan groove with its inner face contacting said smooth capstan groove surface, said tape having a thickness slightly less than the depth of said capstan groove so that the outer face of the tape in the capstan groove is disposed inwardly of the capstan periphery beyond said groove, a rotatable roller of distortable resilient material extending across the tape in the capstan groove and extending on at least one side of the capstan groove, a roller support supporting the roller for rotation tangent to the capstan, means biasing the roller support to position the roller in engagement with the periphery of the capstan on said one side of the capstan groove to be driven frictionally by the capstan and spaced from engagement with the outer face of the tape in the capstan groove so that the tape remains stationary in this position of the roller, with the smooth capstan groove surface slipping past the inner face of the tape as the capstan rotates, and means for selectively forcing the roller support toward the capstan to distort the material of the roller into said capstan groove to grip the outer face of the tape for advancing the tape past the capstan as the capstan rotates and the roller is driven frictionally thereby.

6. In combination, a rotary capstan having an annular peripheral groove which presents a smooth surface, an elongated flexible band extending around the capstan and received in said capstan groove, said band having a thickness slightly less than the depth of said capstan groove so that the outer side of the band in the capstan groove is disposed inwardly of the capstan periphery beyond said groove, a rotatable distortable resilient roller extending across the band in the capstan groove and extending on at least one side of the capstan groove, means biasing the roller into engagement with the periphery of the capstan on at least said one side of the capstan groove to be driven frictionally by the capstan and spaced from engagement with the band so that the band remains stationary in this position of the roller, with the smooth capstan groove surface slipping past the band as the capstan rotates, and means for selectively forcing the roller toward the capstan to force the material of the roller into said capstan groove to engage the band and advance the band past the capstan as the capstan rotates and the roller is driven frictionally thereby.

7. In combination, a first rotary member presenting a smooth cylindrical surface which defines a tape receiving portion and an outer surface disposed outward beyond said cylindrical surface at one side thereof, a flexible flat tape extending around said first rotary member with the inner face of the tape engaging said cylindrical surface on said first rotary member, said tape having a thickness slightly less than the spacing of said outer surface on said first rotary member beyond said cylindrical surface thereon, a second rotary member extending across the tape at said first rotary member and positioned tangent to said outer surface on said first rotary member, one of said rotary members having distortable resilient material at the tangential engagement of said rotary members, means biasing said rotary members into frictional engagement of the periphery of said second rotary member with said outer surface on said first rotary member for rotation of said second rotary member frictionally by said first rotary member and with said second rotary member spaced from engagement with the outer face of the tape at said first rotary member, and means for selectively forcing one of said rotary members toward said other rotary member to distort said resilient material and position said second rotary member in frictional engagement with the outer face of the tape.

8. In combination, a first rotary member presenting a first cylindrical surface concentric about its axis of rotation which defines a tape receiving portion, said first rotary member on opposite sides of said tape receiving portion carrying outer circular surfaces concentric with said first cylindrical surface which are disposed beyond said first cylindrical surface radially outward from the axis of rotation of said first rotary member, a flexible flat tape extending around said first rotary member between said outer surfaces with its inner face engaging said first cylindrical surface on said first rotary member, said tape having a thickness slightly less than the spacing of said outer surfaces radially outward beyond said first cylindrical surface on said first rotary member so that the outer face of the tape is disposed radially inwardly of said outer surfaces on said first rotary member, a second rotary member extending across the tape at said first rotary member and positioned tangent to said outer surfaces on said first rotary member, one of said rotary members having distortable resilient material at the tangential engagements between the first and second rotary members, means biasing said second rotary member into frictional engagement with said outer surfaces on said first rotary member to be rotated frictionally by said first rotary member and spaced from engagement with the outer face of the tape at said first rotary member, and means for selectively forcing said second rotary member toward said first rotary member to distort said resilient material and position said second rotary member gripping the outer face of the tape for advancing the tape as said first rotary member rotates and said second rotary member is driven frictionally thereby.

9. In combination, a rotary capstan presenting a first cylindrical surface concentric about the axis of rotation of the capstan and outer circular surfaces concentric with said first cylindrical surface which are disposed beyond said first cylindrical surface radially outward from the axis of rotation of the capstan, a flexible elongated tape extending around the capstan between said outer surfaces with its inner face engaging said first cylindrical surface on the capstan, said tape having a thickness slightly less than the position of said outer surfaces radially outward beyond said first cylindrical surface on the capstan so that the outer face of the tape is disposed radially inward with respect to said outer surfaces on the capstan, a rotary roller of distortable resilient material extending across the tape at the capstan and tangent to said outer surfaces on the capstan, means positioning the roller in frictional tangential engagement with said outer surfaces on the capstan to be rotated frictionally by the capstan and spaced from engagement with the outer face of the tape at the capstan, and means for forcing the roller toward the capstan to distort the resilient material of the roller and position the roller in gripping engagement with the outer face of the tape for advancing the tape as the capstan rotates and the roller continues to be driven frictionally thereby.

10. In combination, a first rotary member presenting a first surface concentric about its axis of rotation, said first rotary member at one side of said first surface carrying an outer circular surface concentric with said first surface which is disposed beyond said first surface radially outward from the axis of rotation of said first rotary member, a flexible record tape extending around said first rotary member with its inner face engaging said first surface on said first rotary member, said tape having a thickness slightly less than the spacing of said outer surface radially outward beyond said first surface on the first rotary member so that the outer face of the tape is disposed radially inward with respect to said outer surface on the first rotary member, a second rotary member extending adjacent the tape at said first rotary member and tangent to said outer surface on said first rotary member, means positioning said second rotary member in frictional tangential engagement with said outer surface on said first rotary member to be rotated frictionally by said first rotary member and spaced from engagement with the outer face of the tape at said first rotary member, one of said rotary members having distortable resilient material at the tangential engagement between said first and second rotary members, and means for displacing one of said rotary members toward the other rotary member to distort said resilient material and bring said second rotary member in gripping engagement with the outer face of the tape for advancing the tape as said first rotary member rotates and said second rotary member is driven frictionally thereby.

References Cited in the file of this patent

UNITED STATES PATENTS

| | | |
|---|---|---|
| 419,540 | McMains | Jan. 14, 1890 |
| 633,967 | Smith | Sept. 26, 1899 |
| 2,098,130 | Binford | Nov. 2, 1937 |
| 2,346,194 | Sjostrom | Apr. 11, 1944 |
| 2,598,726 | Stempel | June 3, 1952 |
| 2,624,574 | Camras | Jan. 6, 1953 |